(No Model.) 2 Sheets—Sheet 1.

G. WESTINGHOUSE, Jr.
PRESSURE REGULATOR AND CUT-OFF.

No. 389,032. Patented Sept. 4, 1888.

WITNESSES: INVENTOR,

N. PETERS. Photo-Lithographer, Washington, D. C.

(No Model.) 2 Sheets—Sheet 2.
G. WESTINGHOUSE, Jr.
PRESSURE REGULATOR AND CUT-OFF.
No. 389,032. Patented Sept. 4, 1888.
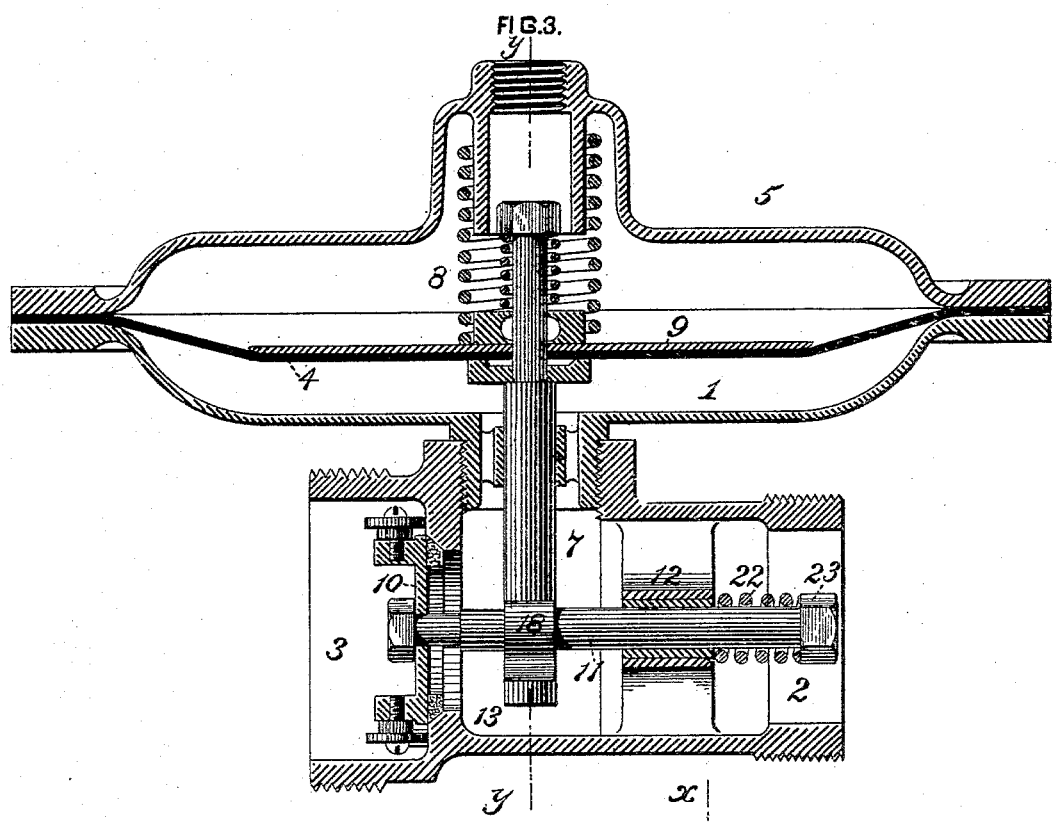
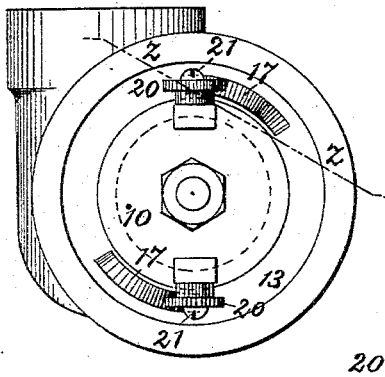
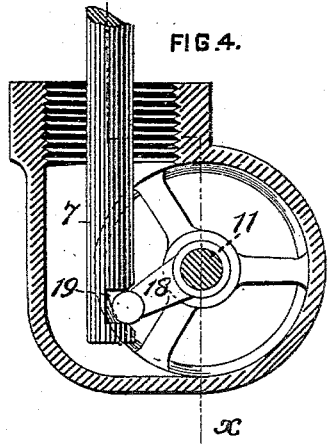
WITNESSES: INVENTOR,

UNITED STATES PATENT OFFICE.

GEORGE WESTINGHOUSE, JR., OF PITTSBURG, PENNSYLVANIA.

PRESSURE-REGULATOR AND CUT-OFF.

SPECIFICATION forming part of Letters Patent No. 389,032, dated September 4, 1888.

Application filed May 22, 1888. Serial No. 274,718. (No model.)

*To all whom it may concern:*

Be it known that I, GEORGE WESTINGHOUSE, Jr., a citizen of the United States, residing at Pittsburg, in the county of Allegheny and State of Pennsylvania, have invented or discovered a certain new and useful Improvement in Pressure-Regulators and Cut-Offs, of which improvement the following is a specification.

The object of my invention is to effect by automatic movements of a single valve the delivery of gas or other fluid under any desired reduction from a determined maximum supply-pressure, and upon an undue increase in supply-pressure, or upon the cessation of the supply of fluid or the diminution of the pressure of the same to a determined minimum, to shut off the delivery of fluid by closing the passage therefor without involving the employment of any appliances for or adjustment in a reinstatement of the device to operative condition after such closure.

To this end my invention, generally stated, consists in the combination of a pressure chamber having a supply and a delivery passage, a regulating and cut-off valve governing the delivery-passage, a movable abutment adapted to be actuated in opposite directions by the fluid-supply pressure and by a spring or weight, respectively, and a valve-moving mechanism interposed between said abutment and the regulating and cut-off valve, and acting to close or seat the latter at the maximum and minimum limits of supply-pressure, and to intermediately vary the degree of opening of the valve coincidently with and proportionately to variations of supply-pressure.

The improvement claimed is hereinafter fully set forth.

Figure 1:
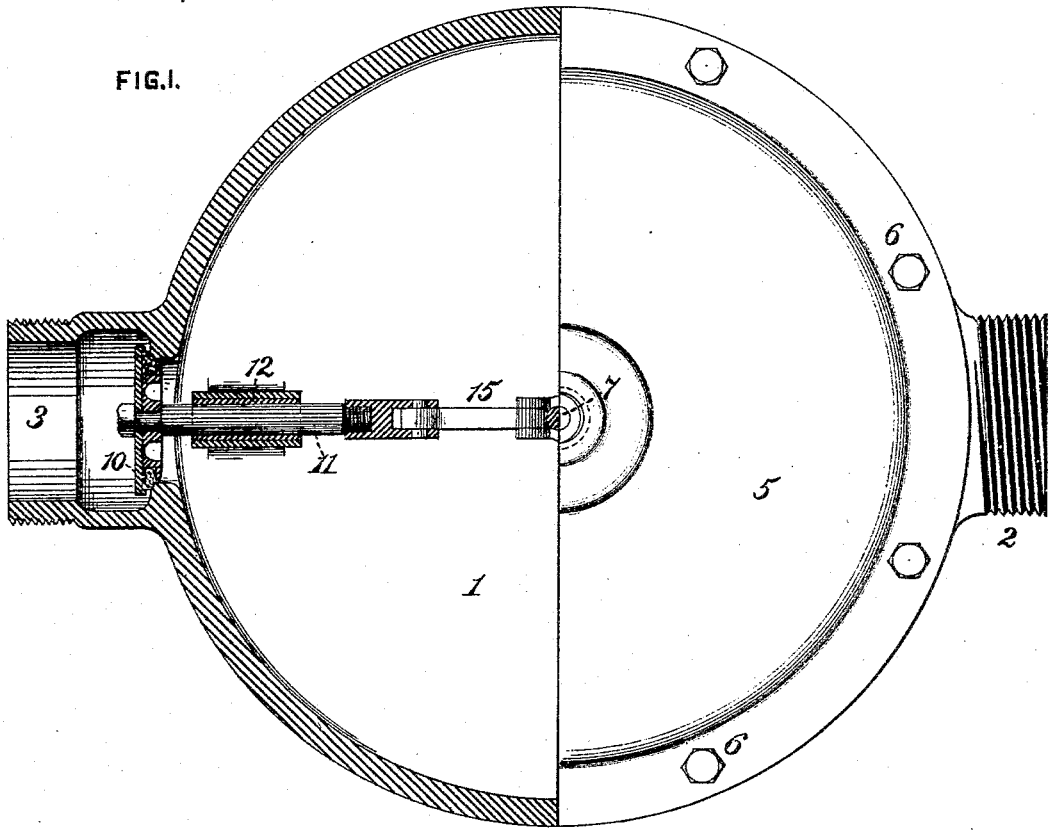
Figure 2:
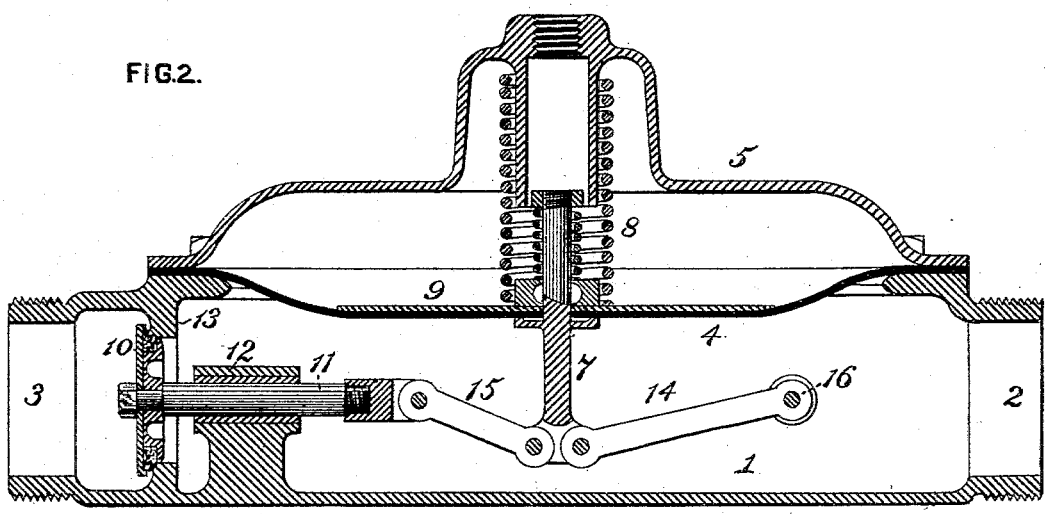

In the accompanying drawings, Figure 1 is a longitudinal central section through a pressure-regulator and cut-off embodying my invention; Fig. 2, a plan view, partly in section; Fig. 3, a longitudinal section illustrating a modification at the line *x x* of Fig. 4; Fig. 4, a transverse section through the lower portion of the pressure-chamber at the line *y y* of Fig. 3; Fig. 5, an end view in elevation, as seen from the left; and Fig. 6, a partial horizontal section at the line *z z* of Fig. 5.

In the practice of my invention I provide a pressure-chamber, 1, having a supply opening or passage, 2, and a delivery-passage, 3, at its opposite ends, which are threaded or otherwise suitably adapted for connection to adjacent sections of a fluid-supply or service pipe, so that the chamber may be interposed in the line of traverse of fluid through said pipe. A movable abutment, 4, is fitted to work in the pressure chamber 1, the form which is preferably employed being, as shown, a flexible diaphragm secured at its periphery between an annular face on the top of the pressure-chamber and a cap or cover, 5, secured by bolts 6 thereto.

It will be obvious that a piston accurately fitting a corresponding bore in the pressure-chamber would constitute a mechanical equivalent of, and might, if preferred, be substituted for, the flexible diaphragm shown. The abutment 4 is fixed upon a stem, 7, and is subject to the downward pressure of a helical spring, 8, bearing at its ends against a plate, 9, on the upper surface of the diaphragm and against the cap 5. A weight may be substituted for and perform the function of the spring 8.

A regulating and cut-off valve, 10, which is secured upon a stem, 11, working in a guide, 12, on the bottom of the pressure-chamber, controls the passage of fluid through a central opening in a partition, 13, interposed between the supply and delivery passages, and is adapted to close or seat, and thereby shut off the delivery of fluid by movement in opposite direction to the supply thereof upon a valve-face formed around the opening of the partition 13. The valve 10 is coupled to the movable abutment 4 by a valve-moving mechanism so constructed as to seat the valve by the movements of the abutment into positions due to and corresponding respectively with the maximum and minimum determined limits of supply-pressure, and to intermediately vary the degree of opening of the valve coincidently with and proportionately to variations of supply-pressure, and thereby maintain a uniform rate of delivery-pressure, accretion of fluid-pressure in the chamber 1 effecting upward movement of the abutment 4, and decrease of fluid-pressure permitting the spring 8 to effect the downward movement of the abutment. The maximum lift or opening of the valve 10 is midway between the positions of the abutment due to maximum and minimum limits of supply-pressure, partial or total closure of the valve being effected by movement of the abutment 4 in either direction from position corresponding with the maximum lift of the valve. In this instance the valve-moving mechanism consists of a pair of toggle-joint levers, 14 15, one of which, 14, is coupled at one end to a pin, 16, fixed to the pressure-chamber in the plane of the valve-stem 11 and consituting a fixed bearing, and at the other to the stem 7 of the abutment 4. The other lever, 15, is coupled at its ends to the abutment-stem 7 and the valve-stem 11, respectively. It will be seen that by the above construction the movement of the abutment within the admitted range of variation of pressure effects the terminal closures and intermediate variations of opening of the valve 10, as required for the performance of the functions of the device, and as above specified.

In the modification illustrated in Figs. 3 to 6, inclusive, the regulating and cut-off valve is similarly operated by the movements of the abutment 4, but with a structural variation of the valve-moving mechanism. The valve-stem 11 is in this case fitted with the capacity of partial rotation as well as of longitudinal movement in its guide 12, and is moved axially by the abutment-stem 7 and longitudinally by fixed cam-plates or inclines 17 fixed upon the outer face of the partition 13. A crank-arm, 18, secured to the valve-stem 11, engages a lateral recess, 19, formed in the abutment-stem 7, near its lower end, and two rollers, 20, are journaled at diametrically-opposite points on pins 21, secured radially upon the outer face of the valve 10, the rollers 20 projecting beyond the periphery of the valve in position to abut against the double-inclined faces of the fixed cam-plates 17, when brought opposite thereto by the axial movements of the valve-stem. The contact of the rollers 20 with the cam-plates 17 raises the valve from its seat, its maximum lift or opening being attained when the rollers abut against the centers of the cam-plates, and partial or total closure of the valve is effected under movement of the abutment in either direction within the range due to the maximum and minimum limits of supply-pressure, as the rollers descend the inclines on either side of the centers of the cam-plates by a spring, 22, bearing against the valve-stem guide 12 and against a collar or nut, 23, on the valve-stem, said spring forcing the valve toward and against its seat in accordance with the variations of axial position of the rollers, due to the variations of position of the abutment 4. The recess 19 of the abutment-stem is made of sufficient width to insure the engagement of the crank-arm 18 therewith throughout the range of longitudinal movement of the valve-stem 11.

I claim as my invention and desire to secure by Letters Patent—

1. In a pressure-regulator and cut-off, the combination of a regulating and cut-off valve controlling an opening for the delivery of fluid under pressure, a movable abutment subject on one side to the fluid-supply pressure and on the other to pressure induced by a spring or weight, and a valve-moving mechanism operated by movements of the abutment and acting to close or seat the valve at the maximum and minimum limits of supply-pressure and to intermediately vary the degree of opening of the valve in accordance with variations of supply-pressure, substantially as set forth.

2. In a pressure-regulator and cut-off, the combination of a pressure-chamber having a supply and a delivery passage, a regulating and cut-off valve governing the delivery-passage, a movable abutment working in the pressure-chamber and adapted to be actuated in opposite directions by the fluid-supply pressure and by a spring or weight, respectively, and a valve-moving mechanism coupling the abutment to the regulating and cut-off valve, these members being combined for joint operation to effect the closure of the valve at the opposite limits of the traverse of the abutment and to intermediately vary the degree of opening of the valve, substantially as set forth.

3. The combination of a pressure-chamber having a supply and a delivery passage, a regulating and cut-off valve governing the delivery-passage, a movable abutment working in the pressure-chamber and adapted to be actuated in opposite directions by fluid-supply pressure and by a spring or weight, respectively, a lever-arm coupling the stems of the abutment and valve, and a fixed bearing controlling the movements of the valve by the abutment, these members being combined for joint operation to effect the closure of the valve at the opposite limits of the traverse of the abutment and to intermediately vary the degree of opening of the valve, substantially as set forth.

4. The combination of a pressure-chamber having a supply and a delivery passage, a regulating and cut-off valve governing the delivery-passage, a movable abutment working in the pressure-chamber and adapted to be actuated in opposite directions by the fluid-supply pressure and by a spring or weight, respectively, and a pair of toggle-joint arms or levers coupling the stem of the abutment to the stem of the regulating and cut-off valve and to a fixed bearing, respectively, substantially as set forth.

In testimony whereof I have hereunto set my hand.

GEO. WESTINGHOUSE, JR.

Witnesses:
W. D. UPTEGRAFF,
J. SNOWDEN BELL.